No. 721,398. PATENTED FEB. 24, 1903.
W. THOMPSON.
EDGE TRIMMING MACHINE FOR BOOTS OR SHOES.
APPLICATION FILED AUG. 6, 1902.
NO MODEL.

Witnesses:
Oscar F. Hill
Nathan B. Day

Inventor:
William Thompson
By Macleod Calvert & Randall
Attorneys.

UNITED STATES PATENT OFFICE.

WILLIAM THOMPSON, OF BROCKTON, MASSACHUSETTS.

EDGE-TRIMMING MACHINE FOR BOOTS OR SHOES.

SPECIFICATION forming part of Letters Patent No. 721,398, dated February 24, 1903.

Application filed August 6, 1902. Serial No. 118,594. (No model.)

*To all whom it may concern:*

Be it known that I, WILLIAM THOMPSON, a citizen of the United States, residing at Brockton, in the county of Plymouth, State of Massachusetts, have invented a certain new and useful Improvement in Edge-Trimming Machines for Boots or Shoes, of which the following is a specification, reference being had therein to the accompanying drawings.

Figure 2:
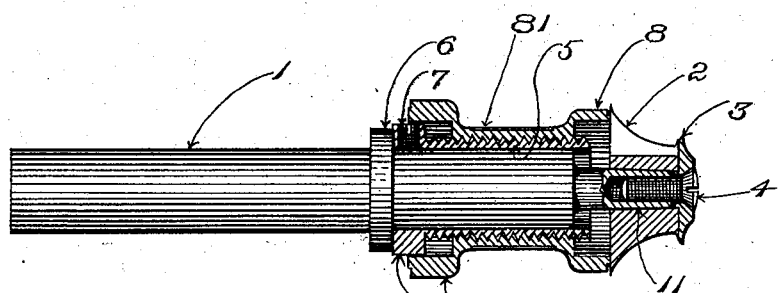
Figure 1:
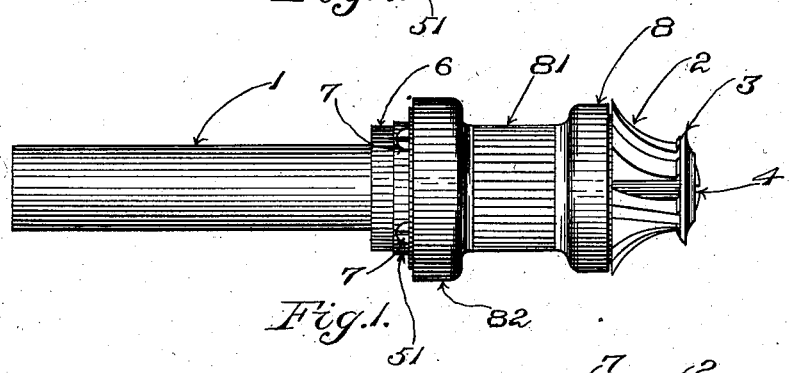
Figure 3:
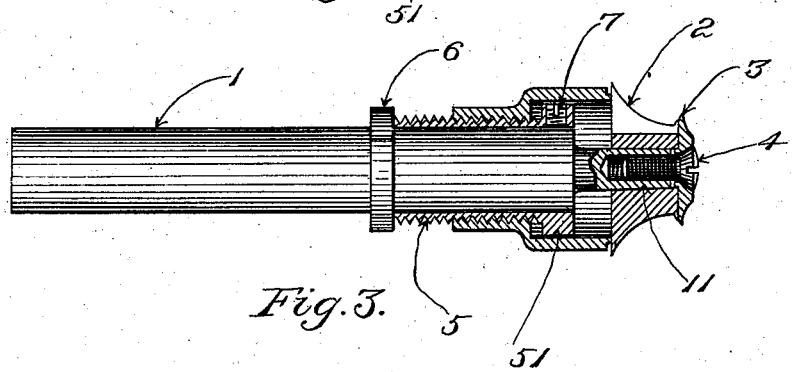

Figure 1 of the drawings shows in elevation portion of the cutter-carrying arbor of an edge-trimming machine with the cutter and one embodiment of my invention applied thereto. Fig. 2 shows the parts of Fig. 1 mainly in vertical longitudinal section. Fig. 3 is a sectional view similar to Fig. 2, showing a second embodiment of the invention.

Having reference to the drawings, the arbor is designated 1, the cutter being indicated at 2, the shield at the outer side of the cutter being shown at 3, and the screw for holding the shield and cutter in place being shown at 4. Customarily the arbor or shaft 1, on which the cutter 2 is mounted in an edge-trimming machine, is formed at its extremity with a slightly-tapering tool-seat 11, smaller in diameter than the main portion of the arbor and onto which the cutter is fitted, as indicated in Figs. 1 and 3, the interior of the eye or bore of the cutter engaging frictionally with the tapering exterior of the said tool-seat and the cutter being kept in place on the tool-seat by the shield 3 and screw 4, as well known to those who are skilled in the art. In applying the cutter to the cutter-carrying arbor or shaft the cutter is slipped upon the slightly-tapering tool-seat and pressed inward along the same until it becomes firmly seated and frictionally engaged, this engagement between the cutter and the said tapering tool-seat being effected by tightening up the screw 4, which last enters the hole that is tapped in the end of the arbor, as shown, the enlarged head of the said screw making contact in usual manner with the outer side of the shield 3, which is placed at the outer end of the cutter. It frequently happens in practice that when it is desired to effect the removal of the cutter from the tool-seat the cutter is found to be so tightly held in place by its frictional engagement with the said tool-seat that considerable force is required to be exerted in order to effect the dislodgment of the cutter after the screw 4 and shield 3 have been removed. At such times it becomes necessary to employ some aid in the shape of a tool in order to drive the cutter off the tool-seat. It happens quite frequently that in the undertaking to remove the cutter the arbor becomes slightly bent, the result of which is defective work in the subsequent use of the machine.

One object of my invention is to provide improved means whereby a cutter shall be properly and securely held in working conditions and relations on the end of the arbor and whereby the removal of the cutter whenever required shall be enabled to be effected quickly, conveniently, and with entire freedom from all tendency to strain or bend the end of the arbor. Another object of the invention is to adapt the latter to be applied to machines such as are already in use, either without necessitating any alteration in the said machines or at the most requiring only a slight adaptation of the parts of such machines.

In accordance with my invention I apply a short sleeve or bushing 5 to the arbor 1. (See Fig. 2.) This is slipped upon the outer extremity of the arbor, and preferably for the purpose of giving the proper position to the said sleeve or bushing lengthwise of the arbor the said sleeve or bushing is caused to make contact with the collar or shoulder 6 upon the arbor. Such a collar or shoulder is already found upon the arbors of some machines at present in use. In the case of other machines I either form the required shoulder by turning the arbor or by slipping a ring or the like onto the arbor and securing it fixedly in place. The sleeve or bushing is secured fixedly in place upon the arbor in suitable manner against the collar or shoulder aforesaid. In some instances the manner of securing the sleeve or bushing in place may vary, according to the views of machine-builders or according to the exigencies in connection with existing machines on which it is desired to apply and use the invention. Preferably I employ three set-screws 7 7, passing through the sleeve or bushing 5 at equal distances apart around the same and biting against the exterior or periphery of the arbor.

This arrangement of securing-screws is advantageous, inasmuch as it enables me to effect slight radial adjustment of the sleeve or bushing 5, such as occasionally may be found necessary in order to center properly the sleeve or bushing and the back-guard which is mounted thereon. The tool-seat 11 of the arbor projects beyond the outer end of the sleeve or bushing 5. The exterior of the said sleeve or bushing is screw-threaded, as shown in Fig. 2. Upon the said exterior is mounted the back-guard 8. This has a hub or sleeve 81, which latter is interiorly threaded to engage with the exterior thread of the sleeve or bushing 5, so that by turning the back-guard relatively to the sleeve or bushing upon the exterior of the latter the back-guard 8 is adjusted in the direction of the length of the arbor. Thus by turning the back-guard 8 in the proper direction relatively to the said sleeve or bushing 5 and arbor 1 the back-guard may be advanced against the inner end of the cutter after the latter has been applied to the tool-seat 11. When it is desired to effect the removal of the cutter, all that is necessary is to first remove the securing-screw 4 and then slightly turn the back-guard, so as to advance the same a trifle in the direction of the cutter. This advance of the back-guard will press the cutter along the tapering tool-seat and readily loosen the same, so that its removal is provided for without the least particle of strain upon the arbor and without any tendency whatever to bend the latter. By turning the back-guard reversely relative to the sleeve or bushing 5 it is caused to recede inwardly along the arbor, away from the tool-seat, so as to leave the latter clear and facilitate the replacement of the cutter.

From the foregoing it will be clear that my invention provides for mounting the back-guard upon the arbor, also for properly centering the back-guard, also for adjusting the back-guard into proper working relations with the cutter, which is applied to the tool-seat on the end of the arbor, and also for loosening the cutter from the said tool-seat without strain or injury to the arbor or cutter whenever the removal of the cutter becomes necessary.

One feature of the invention consists in adapting the back-guard to use in connection with cutters of different diameters. With this object in view I make the back-guard double-ended and reversible, as shown in Figs. 1 and 2, each end thereof being adapted to serve as a back-guard in connection with a cutter, and I make the two ends 8 and 82 of different diameters, as shown, so as to suit cutters of two different sizes or diameters.

In the embodiment of the invention which is shown in Figs. 1 and 2 the sleeve or bushing 5, which is mounted upon the arbor, has a collar or enlarged portion 51 at the inner extremity thereof, the remainder of the sleeve or bushing being of one diameter and it being possible to pass the back-guard onto or off the exterior of the said sleeve or bushing at the outer extremity of the latter. The extremities of the reversible back-guard are bored out to fit over the said collar or enlargement 51 and to permit the back-guard to be adjusted longitudinally. In other embodiments of the invention—as, for instance, in Fig. 3—I locate the enlargement 51 at the outer end of the sleeve or bushing 5. In such cases the said enlargement prevents the back-guard from passing off the outer end of the sleeve or bushing. Thereby the back-guard is prevented from working off and flying away from the outer end of the arbor during the rotation of the said arbor after the cutter has been taken off from the said arbor and applied to the grinding devices with which the machine is equipped.

I claim as my invention—

1. In an edge-trimming machine, the combination with the arbor 1 provided with the tool-seat at its outer extremity, the cutter applied to the said tool-seat, and means to secure the cutter upon the said tool-seat, of the sleeve or bushing located at the inner end of the said tool-seat, fixed upon the portion of the said arbor adjacent the said tool-seat and formed with the screw-thread, and the back-guard having the screw-threaded hub or sleeve fitted to the screw-threaded portion of the said sleeve or bushing.

2. In an edge-trimming machine, the combination with the arbor 1 having the tool-seat at its outer extremity, the cutter applied to the said tool-seat, and means to secure the cutter upon the said tool-seat, of the sleeve or bushing fixed upon the said arbor adjacent the said tool-seat and formed with the screw-thread, and the reversible back-guard having the screw-threaded hub or sleeve fitted to the said sleeve or bushing.

3. In an edge-trimming machine, the combination with the arbor having the tool-seat at its outer extremity, the cutter mounted upon said tool-seat, and means for securing the cutter in place, of the screw-threaded sleeve mounted upon the said arbor at the inner end of the said tool-seat, the plurality of set-screws by which said sleeve or bushing is secured in place, and the back-guard having the screw-threaded hub or sleeve fitted to the said sleeve or bushing.

4. In an edge-trimming machine, the combination, with the arbor formed with the tool-seat and having the shoulder or collar 6, the cutter mounted upon the said tool-seat, and means to secure the cutter in place, of the screw-threaded sleeve mounted upon the said arbor at the inner end of the said tool-seat and making contact with the said shoulder or collar, and the back-guard having the screw-threaded hub or sleeve fitted to the said sleeve or bushing.

5. In an edge-trimming machine, the combination with the abor 1 provided with the tool-seat at its outer extremity, the cutter applied to the said tool-seat, and means to secure the cutter upon the said tool-seat, of the sleeve or bushing located at the inner end of the said tool-seat, fixed upon the portion of the said arbor adjacent the said tool-seat, formed with the screw-thread, and having the enlargement or collar at its outer end to prevent dislodgment of the back-guard, and the back-guard having the screw-threaded hub or sleeve fitted to the screw-threaded portion of the said sleeve or bushing.

In testimony whereof I affix my signature in presence of two witnesses.

WILLIAM THOMPSON.

Witnesses:
CHAS. F. RANDALL,
WILLIAM A. COPELAND.